United States Patent Office 3,502,666
Patented Mar. 24, 1970

3,502,666
3,1-BENZOTHIAZINE DERIVATIVES
Heinz Kuch, Karl Schmitt, and Gunther Seidl, Frankfurt am Main, and Irmgard Hoffmann, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed Nov. 16, 1967, Ser. No. 683,454
Claims priority, application Germany, Nov. 26, 1966,
F 50,772
Int. Cl. C07d 93/08; A61k 27/00
U.S. Cl. 260—243
5 Claims

ABSTRACT OF THE DISCLOSURE 2-amino-4,4-di-substituted benzothiazine derivatives having an action on the central nervous system.

The present invention provides new 3,1-benzothiazine derivatives having valuable pharmacological properties and a process for their manufacture.

More particularly, the present invention provides derivatives of 4H-3,1-benzothiazine of the general formula

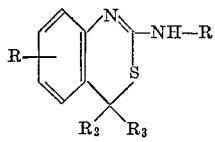

(I)

in which R represents a hydrogen atom or an alkyl, cyloalkyl, alkenyl, cycloalkenyl, aryl, aralkyl group or a lower dialkylamino-alkyl group in which latter the dialkylamino group may form a ring which may be closed through an oxygen or sulphur atom or by a methyl imino group or a benzyl imino group, $R_1$ represents a hydrogen or halogen atom, a methoxy, trifluoromethyl or nitro group, and $R_2$ and $R_3$ may be identical or different and each represents an alkyl, cycloalkyl, aralkyl or aryl radical, in which the phenyl ring of the aralkyl or aryl radical may be substituted by halogen atoms or by methoxy, trifluoromethyl or nitro groups, and of their salts with physiologically acceptable acids; these compounds have valuable pharmacological properties, especially a depressive effect on the central nervous system and also a stimulating, tranquillizing and narcosis-prolonging effect and in addition also, for example, an analgesic and spasmolytic activity combined with an extremely low toxicity.

Furthermore, the present invention provides a process for the manufacture of the compounds of the Formula I, according to which (a) A compound of the general Formula II

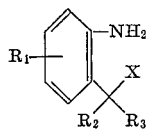

(II)

in which $R_1$ to $R_3$ have the above meanings and X represents a chlorine or bromine atom, a hydroxyl, mercapto, alkoxy, alkylthio or alkanoyloxy group, is reacted with a thiourea of the general Formula (IIIa)

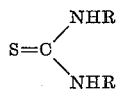

(IIIa)

in which R has the above meaning an dthe two radicals R may be identical or different—or with an isothiocyanate of the general Formula (IIIb)

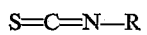  S=C=N—R (IIIb)

in which R has the above meaning or with a corresponding isothiocyanate former, if desired or required with addition of an acid and/or a dehydrating agent, or (b) A compound of the general Formula IV

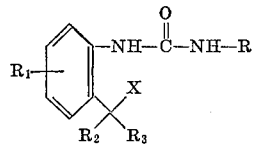

(IV)

in which X, R, $R_1$ to $R_3$ have the above meanings—or a corresponding functional derivative of such a urea is reacted with hydrogen sulphide or an inorganic sulphide or a dehydrating agent, if desired or required with addition of an acid, or (c) A compound of the general Formula V

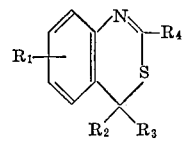

(V)

in which $R_1$ to $R_3$ have the above meanings and $R_4$ represents a chlorine or bromine atom, an amino, mercapto or S-alkyl group—is reacted with an amine of the general formula or its salts

R'—NH$_2$ (VI)

in which R' has the same meaning as R except for hydrogen, or (d) A compound of the general Formula V, in which $R_1$ to $R_3$ have the above meanings and $R_4$ represents the amino group, is reacted with a reactive derivative of an alcohol of the general formula

R'OH (VIII)

in which R' has the meaning defined above, or (e) A compound of the general Formula VIII

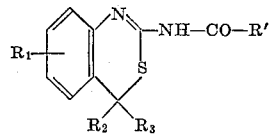

(VIII)

in which $R_1$ to $R_3$ have the above meanings and R' represents an alkyl, alkenyl, aryl, aralkyl, halogenalkyl or lower dialkylaminoalkyl group, in which the dialkylamino group may form a ring which may be closed through an oxygen or a sulphur atom or a methyl imino group or a benzyl imino group, is hydrolyzed or reduced with a complex metal hydride and, when R' stands for a halogenalkyl group, the compound (VIII), before or after reduction of the acyl group is reacted with a dialkylamine which, according to the definition of R, may also be cyclic, or (f) A compound of the general Formula IX

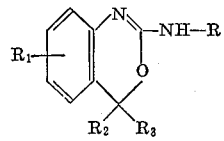

(IX)

in which R, $R_1$ to $R_3$ have the above meanings—is reacted with hydrogen sulphide or an inorganic sulphide and, if desired to obtain salts, a resulting basic compound is converted into its acid addition salts by treatment with inorganic or organic acids.

For the reaction according to (a) suitable starting materials of the general Formula II are preferably α,α-disubstituted 2-aminobenzyl alcohols, of which the following may be mentioned:

α,α-dimethyl-2-aminobenzyl alcohol,
α,α-dimethyl-2-aminochlorobenzyl alcohols,
α,α-dimethyl-2-aminobromobenzyl alcohols,
α,α-dimethyl-2-aminonitrobenzyl alcohols,
α,α-diethyl-2-aminobenzyl alcohol,
α,α-diethyl-2-aminofluorobenzyl alcohols,
α,α-diethyl-2-aminochlorobenzyl alcohols,
α,α-diethyl-2-aminomethoxybenzyl alcohols,
α,α-dipropyl-2-aminobenzyl alcohol,
α,α-dipropyl-2-aminochlorobenzyl alcohols,
α,α-dipropyl-2-aminotrifluoromethylbenzyl alcohols,
α,α-dibutyl-2-aminobenzyl alcohol,
α,α-dibutyl-2-aminochlorobenzyl alcohols,
α,α-diphenyl-2-aminochlorobenzyl alcohols,
α-methyl-α-ethyl-2-aminobenzyl alcohol,
α-methyl-α-ethyl-2-aminochlorobenzyl alcohols,
α-methyl-α-propyl-2-aminobenzyl alcohol,
α-methyl-α-propyl-2-aminobromobenzyl alcohols,
α-methyl-α-cyclohexyl-2-aminochlorobenzyl alcohols,
α-methyl-α-benzyl-2-aminochlorobenzyl alcohols,
α-methyl-α-phenyl-2-aminobenzyl alcohols,
α-methyl-α-phenyl-2-aminochlorobenzyl alcohols, especially α-methyl-α-phenyl-2-amino-5-chlorobenzyl alcohol,
α-methyl-α-phenyl-2-aminonitrobenzyl alcohols,
α-methyl-α-methoxyphenyl-2-aminochlorobenzyl alcohols.
α-ethyl-α-butyl-2-aminobenzyl alcohol,
α-ethyl-α-phenyl-2-aminobenzyl alcohol,
α-ethyl-α-phenyl-2-aminochlorobenzyl alcohols, especially α-ethyl-α-phenyl-2-amino-5-chlorobenzyl alcohol,
α-ethyl-α-chlorophenyl-2-aminochlorobenzyl alcohols,
α,α-isopropyl-α-phenyl-2-aminochlorobenzyl alcohols,
α-isobutyl-α-phenyl-2-aminochlorobenzyl alcohols.

The substituents mentioned following upon "2-amino" may be in position 3, 4, 5 or 6 of the benzene ring.

It is also possible to use the lower O-alkyl ethers corresponding to the above-mentioned benzyl alcohols, for example α-methyl-α-phenyl-2-amino-5-chlorobenzyl alcohol methyl ether or ethyl ether, or the corresponding mercaptans or lower alkylthioethers, the corresponding halides such as diphenyl-2-aminophenylchloromethane or -bromomethane or the corresponding esters with lower aliphatic carboxylic acids, for example the acetates or propionates of the benzyl alcohols mentioned. The salts with strong acids, such as hydrohalic acids, sulphuric acid, benzenesulphonic or toluenesulphonic acids, derived from the basic compounds mentioned, are likewise suitable for use as starting materials.

The above-mentioned benzyl alcohols can be manufactured, for example, by reacting suitably substituted anthranilic acid esters or suitable 2-aminophenylketones with Grignard reagents.

As starting materials of the general Formula IIIa there are suitable thiourea and its N-monosubstituted and N,N'-disubstituted derivatives, such as N-methylthiourea, N-ethylthiourea, N-propylthiourea, N-isopropylthiourea, N-butylthiourea, N-isobutylthiourea, N-hexylthiourea, N-cyclohexylthiourea, N-allylthiourea, N-cyclohexenylthiourea, N-phenylthiourea, N-benzylthiourea, N-diethylaminoethylthiourea, N-dimethylaminopropylthiourea, N,N'-dimethylthiourea, N,N'-diethylthiourea. As starting materials of the general Formula IIIb there are suitable isothiocyanates such as methyl-, ethyl-, propyl-, isopropyl-, butyl-, isobutyl-, hexyl-, cyclohexyl-, allyl-, cyclopentenyl-, phenyl-benzyl-, dimethylaminoethyl-, piperidinoethyl-, morpholinoethyl-, N-methylpiperazinoethyl-, diethylaminopropyl-, pyrrolidinopropyl-, thiamorpholinopropyl-, N-benzylpiperazino-propyl-isothiocyanate. Instead of the isothiocyanates it is possible to use isothiocyanate formers, such as the corresponding thiourethanes or dithiocarbamic acid esters.

The reaction of the compounds of the general Formula II and of their acid addition salts with the thioureas of the general Formula IIIa is carried out at a temperature within the range from 20 to 250° C., preferably from 80 to 180° C., in the presence of an inorganic or organic acid, for example a hydrohalic acid such as hydrochloric, hydrobromic or hydroiodic acid, or of sulphuric or phosphoric acid, or of a lower aliphatic carboxylic acid such as formic or acetic acid, of a halocarboxylic acid such as chloracetic or trifluoracetic acid, or of benzenesulphonic or toluenesulphonic acid, or of mixtures of such acids. If desired, the reaction may alternatively be carried out in the presence of a dehydrating agent, for example of an inorganic acid halide or anhydride such as phosphorus trichloride, tribromide or pentachloride, or thionylchloride or phosphorus pentoxide, also zinc chloride or boron fluoride.

The isothiuronium salts of the general Formula II, in which X is the residue

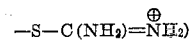

which are formed during the reaction of compounds of the general Formula II with thioureas of the Formula IIIa, are in general not isolated since they are readily transformed into the process products under the reaction conditions.

The reaction of the compounds of the general Formula II with the compounds of the general Formula IIIb is carried out at a temperature within the range from 0 to 200° C., preferably from 20 to 130° C. Intermediately formed thiourea derivatives, which if desired can be isolated as intermediates, are subsequently advantageously converted into the process products by treating the reaction mixture or the isolated intermediates with inorganic or organic acids or with dehydrating agents; depending on the reaction speed this treatment may be carried out with advantage at an elevated temperature.

If required, there may be used as additional solvents or diluents water, lower alcohols such as methanol, ethanol or isopropanol, ethers such as diethyl ether, tetrahydrofuran or dioxane, also glycol, glycol monomethyl or monoethyl ether, di- and tri-ethyleneglycol or aromatic hydrocarbons such as benzene, toluene, xylene or chlorinated hydrocarbons such as chlorobenzene, chloroform, trichloroethylene or tetrachloroethane. The choice of solvent or diluent depends on the stability and reactivity of the reactants concerned.

In the reaction of the benzhydryl halides of the general Formula II (X=Cl or Br) or of their acid addition salts with the compounds of the general Formulas IIIa and IIIb the presence of acids or dehydrating agents is in general not needed to cyclize the intermediately formed thiourea derivatives. These reactions are advantageously carried out in the melt or by heating in a suitable solvent.

The reaction times can be varied within wide limits to suit the reactivity of the reactants concerned and the chosen temperature. For working up the reaction products of the general Formula I, which in most cases are obtained in the form of salts, can be directly isolated, if required after concentration of the solution, then, if desired, converted into the free bases by treatment with alkali. Alternatively, the reaction mixture may be alkalinized prior to the isolation, and in this case the process products can be isolated in the usual manner in the form of the free bases.

The starting materials of the general Formula IV needed for the reaction according to (b) are obtained when, for example, a compound of the general Formula II, in which X represents a halogen atom or a hydroxyl, alkoxy, alkanoyloxy or alkylthio group, is reacted with an isocyanate of the general Formula R—N=C=O, in which R stands for the groups defined above.

Instead of compounds of the general Formula IV, the functional derivatives of these ureas, for example compounds that contain instead of the urea grouping a prestage thereof, such as the carbodiimide group, the guanidino or chloroformic acid amidine group, may be used in the reaction according to (b) to produce the process products.

The reaction of the compounds of the general Formula IV with hydrogen sulphide or with inorganic sulphides, such as alkali metal sulphides or phosphorus pentasulphide or their mixtures, is carried out within the temperature range from 50 to 200° C., preferably from 80 to 160° C., if required or desired with addition of acid and use of an organic solvent, for example an aromatic hydrocarbon such as benzene, toluene or xylene, or of an aliphatic or aromatic chlorinated hydrocarbon such as carbon tetrachloride, tetrachloroethane, chlorobenzene or pyridine. Depending on the boiling point of the solvent used and on the required reaction temperature, especially when hydrogen sulphide is used, the reaction may have to be performed under superatmospheric pressure.

Ureas of the general Formula IV, in which X represents the mercapto group, may alternatively be converted into the process products by reaction with dehydrating agents, such as an inorganic acid halide or anhydride.

Compounds of the general Formula V, required as starting materials for the reaction with the amines of the Formula VI or their salts according to (c), can be prepared, for example by reacting a compound of the Formula II with thiourea according to (a), whereby compounds of the Formula V are obtained, in which $R_4$ represents the amino group. When compounds of the general Formula II, in which X stands for a halogen atom, the hydroxyl, mercapto or an alkanoyloxy group, are reacted with carbon disulphide or an alkali metal xanthate in the presence of a base, such as an alkali metal hydroxide (as described, for example, in J. Pharm. Soc. Japan 57, page 54 (1937)), there are obtained compounds of the general Formula V, in which $R_4$ represents the mercapto group. If desired, the resulting mercapto compounds may be alkylated, and then $R_4$ represents the S-alkyl group. The compounds of the general Formula V, in which $R_4$ stands for a chlorine or bromine atom, are, for example, accessible from compounds of the general Formula V, in which $R_4$ represents the amino group, with the aid of the Sandmeyer reaction (for example as described in Helv. Chim. Acta 32, pages 63–68 (1949)).

The reaction according to (c) is carried out within the temperature range from 20 to 250° C., preferably from 80 to 200° C., and takes 15 minutes to 24 hours, the choice of reaction conditions depending on the reactivity of the chosen compound of the general Formula V. In this reaction it is advantageous but not imperative to use a solvent or diluent. Suitable solvents are primarily aromatic hydrocarbons such as benzene, toluene and the xylenes, aliphatic and aromatic chlorinated hydrocarbons such as chloroform, tetrachloroethane, chlorobenzene; also ethers such as tetrahydrofuran, dioxane, glycol dimethyl ether and diethyleneglycol diethyl ether. It is also possible to use an excess of the chosen amine as solvent. Depending on the boiling point of the chosen amine and of the solvent and on the requisite reaction temperature the reaction may have to be carried out in a closed vessel.

For the manufacture of benzothiazines of the Formula I by reacting compounds of the general Formula V, in which $R_4$ represents the amino group, according to (d) with reactive derivatives of alcohols of the general Formula VII there may be used as alcohol derivatives especially their halides, such as chlorides, bromides or iodides, also the corresponding sulphates, carbonates and alkyl- or aryl-sulphonates, for example methyliodide, dimethylsulphate, ethyliodide, benzylbromide, allylbromide, dimethylaminoethylchloride, piperidinopropylchloride, bis-(diethylaminoethyl) - carbonate, ethyltoluenesulphonate. The alkylation is carried out in the usual manner in the presence of a basic condensing agent, such as an alkali metal carbonate, hydroxide or alcoholate, or of an alkali or alkaline earth metal amide or hydride.

The starting materials of the general Formula VIII required for the reaction according to (e) are obtained when, for example, compounds of the general Formula I, in which R represents a hydrogen atom, are acylated in the usual manner with a halide or anhydride of a carboxylic acid, or with a corresponding free carboxylic acid with the use of a dehydrating agent, for example carbodiimides such as dicyclohexyl carbodiimide or chloroformic acid ethyl ester in admixture with tertiary amines such as triethylamine or pyridine. It is also possible to react compounds of the general Formula II with acylisothiocyanates of the general formula R'—CO—N=C=S (where R' has the above meaning) and to convert the resulting acylthioureas in a similar manner as in (b) into compounds of the general Formula VIII.

The compounds of the general Formula VIII are reduced in the usual manner with complex metal hydrides, especially with lithium-aluminium hydride, in an inert solvent, preferably in an ether such as dioxane, diethyl ether, tetrahydrofuran, if desired in admixture with aromatic hydrocarbons, at a temperature ranging from 0° to the boiling temperature of the solvent used.

When halogenacyl compounds are used, they may be first reacted with the corresponding amines such as dimethylamine, diethylamine, dipropylamine or the corresponding heterocyclic amines such as piperidine, pyrrolidine, morpholine, N-methylpiperazine or N-benzylpiperazine or else reduction is carried out as described and the resulting halogenalkyl compounds are then reacted with the amines named in the usual manner. For this purpose an excess of amine is of advantage to combine with the liberated hydrogen halide.

Starting materials of the general Formula IX suitable for the reaction according to (f) are, for example, 2-ethylamino-4,4-dimethyl-4H-3,1-benzoxazine,
2-ethylamino-4,4-dimethyl-6-chloro-4H-3,1-benzoxazine,
2-methylamino-4,4-diethyl-4H-3,1-benzoxazine,
2-amino-4-methyl-4-phenyl-4H-3,1-benzoxazine,
2-ethylamino-4-methyl-4-phenyl-4H-3,1-benzoxazine,
2-amino-4-methyl-4-phenyl-6-chloro-4H-3,1-benzoxazine,
2-methylamino-4-methyl-4-phenyl-6-chloro-4H-3,1-benzoxazine,
2-ethylamino-4-methyl-4-phenyl-6-chloro-4H-3,1-benzoxazine,
2-benzylamino-4-methyl-4-phenyl-6-chloro-4H-3,1-benzoxazine,
2-ethylamino-4-methyl-4-phenyl-5-chloro-4H-3,1-benzoxazine,
2-ethylamino-4-ethyl-4-phenyl-6-chloro-4H-3,1-benzoxazine,
2-ethylamino-4-ethyl-4-chlorophenyl-6-chloro-4H-3,1-benzoxazine.

The reaction of these compounds with hydrogen sulphide or with inorganic sulphides such as alkali metal sulphides or phosphorus sulphides, preferably phosphorus pentasulphide, or mixtures thereof, is carried out within the temperature range from 50° to 200° C., preferably from 80° to 160° C., if desired or required with the use of an organic solvent, such as pyridine, or of an aromatic hydrocarbon such as benzene, toluene or xylene, or of an araliphatic or aromatic chlorinated hydrocarbon such as carbon tetrachloride, tetrachloroethane or chlorobenzene. Depending on the boiling point of the solvent used and on the requisite reaction temperature, especially when hydrogen sulphide is used, the reaction may have to be performed under superatmospheric pressure.

Since the process products are basic compounds they can be converted with inorganic or organic acids into the corresponding salts. Suitable inorganic acids are, for example, hydrohalic acids such as hydrochloric or hydrobromic acid, furthermore sulphuric, phosphoric or amidosulphonic acid. Suitable organic acids are, for example, acetic, propionic, lactic, glycollic, gluconic, fumari, maleic oxalic, succinic, tartari, benzoic, salicylic, citric, aceturic, hydroxyethanesulphonic acid and ethylenediamine-tetraacetic acid, embonic, naphthalenedisulphonic or toluenesulphonic acid.

Combined with an extremely low toxicity the process products possess valuable pharmacological properties, especially a depressive effect on the central nervous system, and a stimulating, tranquilizing and narcosis-prolonging activity and in addition, for example, also analgesic and spasmolytic activity.

Concerning their central depressive effect the products of this invention, for example 2-ethylamino-4-methyl-4-phenyl-6-chloro-4H-3,1-benzothiazine, are distinctly superior to similarly constituted, known compounds, for example 2-ethylamino-4H-3,1-benzothiazine. They are substantially less toxic than the reference compound and display in addition a remarkable delayed central depressive activity and prolong the effects of narcosis.

The central depressive activity is tested by recording the spontaneous and the provoked motility in the mouse and in the somnolence test (Nieschulz, O. et al., Arzneimittelforschung 6, p. 651 (1956)) and the influence on narcosis in the usual manner.

The products of the present invention may be applied as such or in the form of corresponding salts, if desired in admixture with pharmaceutically usual carrier substances. The pharmaceutical preparations may be in the form of tablets, dragées, capsules or suppositories, or they may be in liquid form, for example, in the form of solution, suspension or emulsions. The pharmaceutical preparations may contain the products of the present invention as active substance in an amount ranging from 5 to 500 mg. and the pharmaceutically usual carriers in an amount ranging from 995 to 50 mg.

As the pharmaceutically suitable carrier substances, there may be used those substances which do not react with the products of the invention, for example water, gelatin, lactose, starch, magnesium stearate, talcum, vegetable oils, polyalkylene glycols, and similar substances. They may be sterilized and/or combined with stabilizers. The pharmaceutical preparations may also contain other therapeutically valuable substances.

The products of the present invention serve for the treatment of psychical diseases and disorders, for example, depressions, psychoneuroses, discords and anxiety of neurotic and psychotic genesis.

The following examples illustrate the invention but they are not intended to limit it thereto:

EXAMPLE 1

2-ethylamino-4,4-dimethyl-4H-3,1-benzothiazine (a) A mixture of 30 g. of 2-amino-α,α-dimethylbenzyl alcohol and 26 g. of ethyl mustard oil is heated for 5 minutes at 105° C. When the cooled reaction product is triturated with petroleum ether, 2-(ω-ethylthioureido)-α,α-dimethylbenzyl alcohol is obtained in almost colourless crystals which are suctioned off and recrystallized from benzene with the aid of carbon. Yield: 41 g. (=86% of theory). Melting point 118–120° C.

(b) 36 grams of the compound obtained above under (a) in 180 ml. of hydrobromic acid of 48% strength are stirred and refluxed for 5 minutes. The reaction mixture is cooled rapidly, diluted with water and neutralized with dilute sodium hydroxide solution. The resulting crude 2-ethylamino-4,4-dimethyl-4H-3,1 - benzothiazine, which is first obtained as an oil, solidifies after some time and is suctioned off. Recrystallization of the dried substance from cyclohexane with the aid of animal charcoal furnishes 25 g. (=76% of theory) of colourless crystals melting at 100–101° C.

EXAMPLE 2

2-ethylamino-4,4-diethyl-4H-3,1-benzothiazine (a) 54 grams of 2 - amino-α,α - diethylbenzyl alcohol (melting at 58–60° C.; prepared by reacting anthranilic acid ethyl ester with ethyl magnesium bromide) are reacted with 35 g. of ethyl mustard oil as described in Example 1(a). Crystallization of the reaction product from benzene+cyclohexane furnishes 68 g. (=85% of theory) of 2-(ω-ethylthioureido)-α,α-diethylbenzyl alcohol as colourless crystals melting at 104–105° C.

(b) 27 grams of the compound prepared as described under 2(a) are heated with hydrobromic acid as described in Example 1(b) and suitably worked up, to yield 19.5 g. (=78% of theory) of 2-ethylamino-4,4-diethyl-4H-3,1-benzothiazine in the form of colourless crystals melting at 70–72° C. (from petroleum ether).

EXAMPLE 3

2-ethylamino-4,4-dimethyl-6-chloro-4H-3,1-benzothiazine (a) The reaction described in Example 1(a) of 56 g. of 5-chloro-2-amino-α,α-dimethylbenzyl alcohol (melting at 70 to 80° C.; prepared by Grignardation of 5-chloro-2-aminobenzoic acid methyl ester with methyl magnesium iodide) with 40 g. of ethyl mustard oil furnishes 62 g. (=76% of theory) of 5-chloro-2-(ω-ethylthioureido)-α,α-dimethylbenzyl alcohol melting at 114–115° C. (from benzene+cyclohexane).

(b) 27 grams of the compound obtained under (a) in 100 ml. of hydrobromic acid of 48% strength are stirred and refluxed for 5 minutes. The reaction mixture is cooled rapidly, diluted with water and rendered alkaline with sodium hydroxide solution. On extraction with methylenechloride 2-ethylamino-4,4-dimethyl-6-chloro-4H-3,1-benzothiazine is obtained as an oil which crystallizes from benzene+petroleum ether in colourless crystals melting at 127–129° C. Yield: 17.5 g. (=69% of theory).

EXAMPLE 4

2-methylamino-4-methyl-4-phenyl-6-chloro-4H-3,1-benzothiazine (a) A solution of 50 g. of 5-chloro-2- amino-α-methyl-α-phenyl-benzyl alcohol (melting at 95–96° C.; prepared by reacting 5-chloro-2-aminobenzophenone with methyl magnesium iodide) is mixed with 30 g. of methyl mustard oil and kept for 48 hours at room temperature. The solvent is then distilled off under vacuum and the oily residue crystallized from toluene+petroleum ether, to yield 53 g. (=83% of theory) of pure 5-chloro-2-(ω-methylthioureido)-α-methyl-α-phenyl-benzyl alcohol melting at 153–155° C.

(b) 32 grams of the thiourea derivative obtained under (a) are heated with hydrobromic acid and worked up as described in Example 3(b), to yield 21.5 g. (=72% of theory) of 2-methyl-amino-4-methyl-4-phenyl-6-chloro-4H-3,1-benzothiazine in the form of colourless crystals melting at 142–144° C. (from cyclohexane).

EXAMPLE 5

2-ethylamino-4-methyl-4-phenyl-6-chloro-4H-3,1-benzothiazine (a) A solution of 50 g. of 5-chloro-2-amino-α-methyl-α-phenyl-benzyl alcohol in 150 ml. of ether is mixed with 35 g. of ethyl mustard oil, kept for 48 hours at room temperature, part of the solvent is distilled off under vacuum and the crystalline precipitate is suctioned off, to yield 53 g. (=79% of theory) of pure 5-chloro-2-(ω-ethylthioureido)-α-methyl-α-phenyl-benzyl alcohol melting at 101–103° C. On crystallization from benzene+petroleum ether a higher-melting modification, melting at 112–114° C., is occationally obtained.

(b) 33.5 grams of the thiourea derivative obtained under (a) are heated with hydrobromic acid as described in Example 3(b) and suitably worked up. Recrystallization from benzene+petroleum ether furnishes 27 g. (=85% of theory) of 2-ethylamino-4-methyl-4-phenyl-4H-3,1-benzothiazine in the form of colourless crystals melting at 113–115° C.

EXAMPLE 6

2-ethylamino-4-ethyl-4-phenyl-6-chloro-4H-3,1-benzothiazine (a) 52 grams of 5-chloro-2-amino-α-ethyl-α-phenyl-benzyl-alcohol (prepared by Grignardation of 5-chloro-2-aminobenzophenone with ethyl magnesium bromide) are reacted with 35 g. of ethyl mustard oil as described in Example 1(a). Crystallization of the residue from benzene+petroleum ether furnishes 56 g. (=80% of theory) of 5-chloro-2-(ω-ethylthioureido)-α-ethyl-α-phenyl-benzyl alcohol in the form of almost colourless crystals melting at 141–143° C.

(b) 35 grams of the compound obtained under (a) are heated with hydrobromic acid as described in Example 3(b) and suitably worked up. The crude 2-ethylamino-4-ethyl-4-phenyl-6-chloro-4H-3,1-benzothiazine obtained as a yellow crystal magma is purified by column chromatography on neutral alumina (activity III) with the use of benzene as eluant and there are obtained 24.5 g. (=74% of theory) of colourless crystals melting at 123–124° C. (from benzene+petroleum ether).

EXAMPLE 7

2-amino-4,4-diphenyl-6-chloro-4H-3,1-benzothiazine

A mixture of 15.5 g. of 5-chloro-2-amino-α,α-diphenyl-benzyl alcohol (melting at 127–129° C.; obtained by reacting 5-chloro-2-aminobenzophenone with phenyl magnesium bromide), 4 g. of thiourea and 50 ml. of hydrobromic acid of 48% strength is stirred and refluxed for 1 hour, then allowed to cool, rendered alkaline with dilute sodium hydroxide solution and the whole is repeatedly extracted with benzene. The benzene solution is washed with water and dried over sodium sulphate and evaporated, and the crystalline residue is recrystallized from benzene+petroleum ether, to yield 6.5 g. (=38% of theory) of 2-amino-4,4-diphenyl-6-chloro-4H-3,1-benzothiazine in the form of colourless crystals melting at 250–252° C. Any unreacted starting material left in the mother liquor can be recovered.

EXAMPLE 8

2-ethylamino-4-propyl-4-phenyl-6-chloro-4H-3,1-benzothiazine (a) A mixture of 55.2 g. of 5-chloro-2-amino-α-propyl-α-phenyl-benzyl alcohol (melting at 92–93° C.; obtained by reacting 5-chloro-2-aminobenzophenone with propyl magnesium bromide), 300 ml. of xylene and 21.3 g. of ethyl mustard oil is stirred and heated for 3 hours at 65° C. and then allowed to cool. The precipitate formed is suctioned off, rinsed with xylene+petroleum ether and recrystallized from isopropanol, to yield 58.1 g. (=80% of theory) of 5-chloro-2-(ω-ethylthioureido)-α-propyl-α-phenyl-benzyl alcohol in the form of colourless crystals melting at 150–151° C.

(b) 36.3 grams of the thiourea derivative obtained under (a) are stirred at 110° C. into 150 ml. of hydrobromic acid of 48% strength. The reaction mixture is kept at this temperature for 10 minutes, then rapidly cooled and further worked up as described in Example 3. Crystallization of the crude product from petroleum ether furnishes 26.7 g. (=77% of theory) of 2-ethylamino-4-propyl-4-phenyl-6-chloro - 4H - 3,1 - benzothiazine in the form of colourless crystals melting at 75–77° C.

EXAMPLE 9

2-isopropylamino-4-methyl-4-phenyl-6-chloro-4H-3,1-benzothiazine (a) A mixture of 49.5 g. of 5-chloro-2-amino-α-methyl-α-phenylbenzyl alcohol, 24.3 g. of isopropyl mustard oil and 50 ml. of petroleum ether is stirred and heated for 2 hours at 65° C. The reaction mixture is kept overnight at room temperature, the crystalline residue suctioned off and the remaining starting material is removed by extraction with an equal quantity by weight of toluene, to yield 52.3 g. (=75% of theory) of pure 5-chloro-2-(ω - isopropylthioureido)-α-methyl - α - phenyl-benzyl alcohol melting at 161–162° C.

(b) 17.4 grams of the compound obtained under (a) are heated with hydrobromic acid as described in Example 8(b), to yield 15.3 g. (=93% of theory) of 2-isopropylamino-4-methyl-4-phenyl-6-chloro-4H-3,1 - benzothiazine as a bright oil. Its oxalate forms colourless crystals melting at 188–190° C. with decomposition.

EXAMPLE 10

2-amino-4-methyl-4-phenyl-6-chloro-4H-3,1-benzothiazine 25 g. of 5-chloro-2-amino-α-methyl-α-phenyl-benzyl-alcohol and 7.6 g. of thiourea in 25 ml. of isopropanol are heated for 30 minutes, while stirring, with 20 ml. of concentrated hydrochloric acid on a steam bath, the whole is then rapidly cooled and diluted with water. After neutralisation with a solution of sodium carbonate, the solution is extracted with toluene, the organic phase is washed with water, dried and concentrated by evaporation under reduced pressure. The remaining residue can be crystallized from a mixture of toluene and petrol ether, whereby 16 g. (55% of the theory) of 2-amino-4-methyl-4-phenyl-6-chloro-4H-3,1-benzothiazine in the form of colourless crystals melting at 170–171° C. are obtained.

EXAMPLE 11

2-ethylamino-4-methyl-4-phenyl-6-chloro-4H-3,1-benzothiazine (a) 14.5 g. of 2-amino-4-methyl-4-phenyl-6-chloro-4H-3,1-benzothiazine (prepared according to Example 10) in 50 ml. of toluene are combined with 6 g. of acetanhydride and allowed to stand for one day at room temperature. The crystalline precipitate of 2-acetylamino-4-methyl-4-phenyl-6-chloro-4H-3,1-benzothiazine is filtered off with suction and the filtrate is shaken out with a sodium hydrogeno-carbonate solution and then concentrated by evaporation under reduced pressure, whereby a further quantity of the acetyl compound is obtained. After recrystallization from a mixture of toluene and petrol ether, 12.5 g. (76% of the theory) of colourless crystals melting at 184–185° C. are obtained.

(b) 10 g. of the acetyl compound prepared according to (a) are reduced with 2.4 g. of lithium aluminium hydride in 150 ml. of absolute ether. After having boiled for one hour, while stirring and refluxing, decomposition is effected with precaution by the addition of water and the aluminium hydroxide that has precipitated is filtered off. The filtrate is washed with water, dried over sodium sulfate and concentrated by evaporation. After recrystallization of the residue from petrol ether, 8 g. (84% of the theory) of 2-ethylamino-4-methyl-4-phenyl-6-chloro-4H-3,1-benzothiazine in the form of colourless crystals melting at 113–115° C. are obtained.

EXAMPLE 12

2-benzylamino-4-methyl-4-phenyl-6-chloro-4H-3,1-benzothiazine (a) A solution of 18 g. of benzoyl-isothiocyanate in 20 ml. of toluene is added slowly and dropwise, at 20° C., while stirring, to a solution of 25 g. of 5-chloro-2-amino-α-methyl-α-phenyl-benzyl alcohol in 80 ml. of toluene. After having continued stirring for one hour, the precipitate that has formed is filtered off with suction, washed with petrol ether and recrystallized from a mixture of ethanol and water with addition of animal charcoal. In this way, 32 g. (73% of the theory) of 5-chloro-2-(ω-benzoyl-thioureido)-α-methyl-α-phenyl-benzyl alcohol in the form of colourless crystals melting at 163–164° C. are obtained.

(b) 20 g. of the thiourea derivative prepared according to (a) are heated as described in Example 3(b) with hydrobromic acid and worked up accordingly. After recrystallization from a mixture of ethanol and water, 17.5 g. (89% of the theory) of 2-benzoylamino-4-methyl-4-phenyl-6-chloro-4H-3,1-benzothiazine are obtained in the form of colourless crystals melting at 180–182° C. are obtained.

(c) 15 g. of the compound prepared according to (b) are reduced with 3 g. of lithium aluminium hydride in 400 ml. of absolute ether. After having boiled the whole for 1½ hours, while stirring and refluxing, the reaction mixture is worked up as described in Example 11(b), whereby 2-benzyl-amino-4-methyl-4-phenyl-4H-3,1-benzothiazine is obtained in form of a light oil which solidifies in crystalline form after some days. By recrystallization from petrol ether 10.5 g. (72% of the theory) of colourless crystals melting at 112–113° C. are obtained.

EXAMPLE 13

2-(2'-diethylaminoethyl)-amino-4-methyl-4-phenyl-6-chloro-4H-3,1-benzothiazine (a) 37 g. of 5-chloro-2-amino-α-methyl-α-phenyl-benzylalcohol and 24 g. of 2-diethylaminoethyl-isothiocyanate are heated for 6 hours, while stirring, to 65° C., in 100 ml. of cyclohexane. After addition of 150 ml. of petrol ether (boiling point 60–95° C.), stirring is continued for 30 minutes, the crystalline precipitate is filtered off and washed with a mixture of cyclohexane and petrol ether (1:1). In this way, 51.5 g. (84% of the theory) of pure 5-chloro-2-(ω-diethylaminoethyl-thioureido) - α - methyl-α-phenyl-benzyl alcohol melting at 127–128° C. are obtained.

(b) 20 g. of the thiourea derivative prepared according to (a) are heated for 5 minutes on a steam bath, while stirring vigorously, in 80 ml. of hydrochloric acid having a strength of 20%. The reaction mixture is rapidly cooled, diluted with water and neutralized with a sodium hydroxide solution. By extraction with benzene, 2-(2'-diethylaminoethyl) - amino - 4-methyl-4-phenyl-6-chloro-4H-3,1-benzothiazine is obtained in the form of a weekly yellowish oil which yields a crystallized hydrochloride with anhydrous hydrogen chloride in isopropanol. Yield: 14.5 g. of colourless crystals melting at 197–198° C.

EXAMPLE 14

2-benzylamino-4-methyl-4-phenyl-6-chloro-4H-3,1-benzothiazine 14.5 g. of the 2-amino-4-methyl-4-phenyl-6-chloro-4H-3,1-benzothiazine prepared according to Example 10 are boiled for 2½ hours under reflux in 25 ml. of benzylamine. After cooling, the reaction mixture is diluted with petrol ether, whereupon 2 - benzylamino - 4 - methyl-4-phenyl-4H-3,1-benzothiazine separates at first in the form of an oil. Upon chromatography on neutral aluminum oxide having the activity degree III, using a mixture of benzene and petrol ether (1:1) as the elution medium, and after recrystallization from petrol ether, 14 g. (73% of the theory) of colourless crystals are obtained which melt at 112–113° C. and which show no melting point depression with the compound prepared according to Example 12(c).

We claim:

1. A 3,1-benzothiazine derivative of the formula

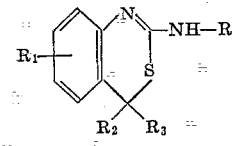

in which R represents hydrogen, alkyl of from 1 to 6 carbon atoms, cyclohexyl, allyl, cyclopentenyl, cyclohexenyl, phenyl, benzyl, lower dialkylamino-lower alkyl, piperidino-lower alkyl, morpholino-lower alkyl, pyrrolidino-lower alkyl, thiamorpholino-lower alkyl, N-methylpiperazino-lower alkyl or N-benzylpiperazino-lower alkyl; $R_1$ is hydrogen, halogen, methoxy, trifluoromethyl or nitro; and $R_2$ and $R_3$, which are the same or different, represent alkyl of from 1 to 4 carbon atoms, cyclohexyl, phenyl or benzyl, the latter two optionally containing halogen atoms, methoxy, trifluoromethyl or nitro groups in the phenyl ring.

2. A compound as claimed in claim 1, wherein R is lower alkyl.

3. A compound as claimed in claim 1, wherein R is ethyl and $R_1$ is chlorine in 6-position.

4. A compound as claimed in claim 1, wherein $R_2$ is lower alkyl and $R_3$ is phenyl.

5. 2-Ethylamino - 4 - methyl-4-phenyl-6-chloro-4H-3,1-benzothiazine.

References Cited

UNITED STATES PATENTS 3,417,085  12/1968  Kuch et al. _____ 260—243

OTHER REFERENCES

Beilenson et al., J. Chem. Soc. (1942) pp. 98–102.

HENRY R. JILES, Primary Examiner

J. M. FORD, Assistant Examiner

U.S. Cl. X.R.

260—999